United States Patent
Kitagawa (10) Patent No.: US 8,544,891 B2
(45) Date of Patent: Oct. 1, 2013

(54) WASHER INLET ATTACHING STRUCTURE

(75) Inventor: Tohru Kitagawa, Okazaki (JP)

(73) Assignee: Mitsubishi Jidosha Kogyo Kabushiki Kaisha, Tokyo (JP)

(*) Notice: Subject to any disclaimer, the term of this patent is extended or adjusted under 35 U.S.C. 154(b) by 1091 days.

(21) Appl. No.: 12/537,071

(22) Filed: Aug. 6, 2009

(65) Prior Publication Data
US 2010/0032987 A1 Feb. 11, 2010

(30) Foreign Application Priority Data
Aug. 7, 2008 (JP) ................ P2008-203778

(51) Int. Cl.
*B60S 1/50* (2006.01)
(52) U.S. Cl.
USPC ...... 280/830; 280/834; 296/96.15; 239/284.1
(58) Field of Classification Search
USPC .............. 280/830, 834; 296/96.15; 141/311
See application file for complete search history.

(56) References Cited

U.S. PATENT DOCUMENTS

| 5,000,333 | A | * | 3/1991 | Petrelli | 220/890 |
| 6,044,517 | A | * | 4/2000 | Zendler et al. | 15/250.01 |
| 6,223,793 | B1 | * | 5/2001 | Donoughe et al. | 141/338 |
| 6,976,513 | B2 | * | 12/2005 | Schlachter | 141/88 |
| 7,017,629 | B2 | * | 3/2006 | Winterling | 141/327 |
| 2007/0006925 | A1 | * | 1/2007 | Toscano et al. | 137/587 |

FOREIGN PATENT DOCUMENTS

| JP | 60-70524 U | 5/1985 |
| JP | 62-163170 U | 10/1987 |
| JP | 7-329733 A | 12/1995 |
| JP | 2007-245788 A | 9/2007 |

* cited by examiner

*Primary Examiner* — Kevin Hurley
*Assistant Examiner* — Michael Stabley
(74) *Attorney, Agent, or Firm* — Birch, Stewart, Kolasch & Birch, LLP (57) ABSTRACT

A washer inlet attaching structure, configured to attach a washer inlet to a vehicle structural body made of resin, the washer inlet communicating with a tank main body adapted to store a windshield washer fluid and guiding the windshield washer fluid into the tank main body, the washer inlet attaching structure includes a washer inlet holding portion, configured to hold the washer inlet, the washer inlet holding portion being molded integrally with the vehicle structural body.

4 Claims, 13 Drawing Sheets

WASHER INLET ATTACHING STRUCTURE

BACKGROUND

1. Field of the Invention

The present invention relates to a washer inlet attaching structure for attaching a washer inlet of a washer tank of a motor vehicle to a vehicle structural body.

2. Description of the Related Art

A washer tank of a motor vehicle is a tank for storing a windshield washer fluid which is used by a windshield wiper system of the vehicle. The washer tank is disposed within an engine compartment of the vehicle, for example. Other component elements are also disposed within the engine compartment, and the washer tank is disposed in such a manner as to avoid accommodation spaces for those component elements. This sometimes causes a case where a washer tank cannot be disposed as an upper portion of the engine compartment, and as this occurs, a washer tank is used which has a configuration in which a washer inlet (a pouring pipe) is provided on a tank main body.

In attaching a washer tank having the configuration described above to a vehicle body, not only is the washer tank fixed to a vehicle structural body, but also the washer inlet is fixed to the vehicle structural body. This prevents the looseness or unsteadiness of the washer inlet.

BACKGROUND OF THE INVENTION

In recent years, there are more and more vehicles which employ resins for their structural bodies. As a washer inlet attaching structure for fixing the washer inlet to such a vehicle structural body of resin, there is known a structure like one shown in FIGS. 9A and 9B. In this washer inlet attaching structure, a bracket 310 is attached to a washer inlet 301, and the bracket 310 is then fixed to a vehicle structural body 321 with a fixing tool 316 such as a clip.

Figure 9A:
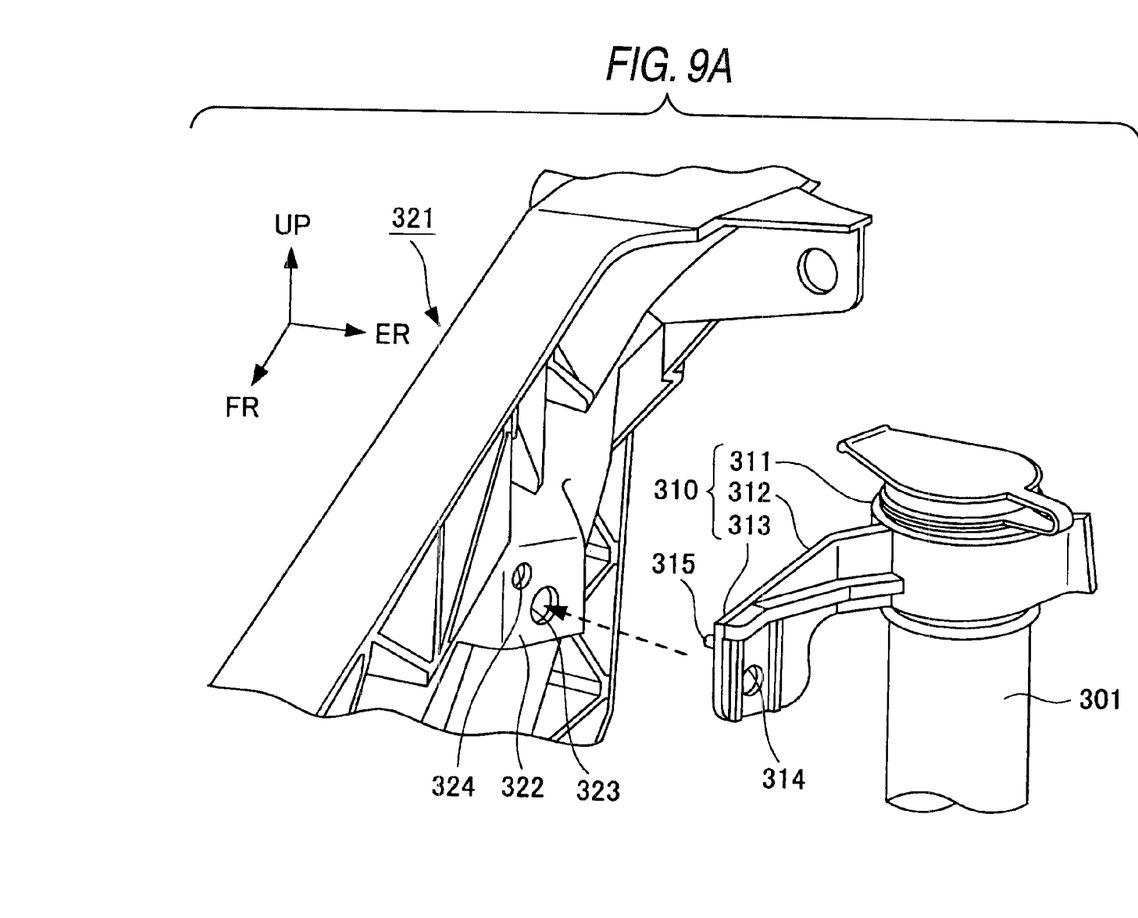
Figure 9B:
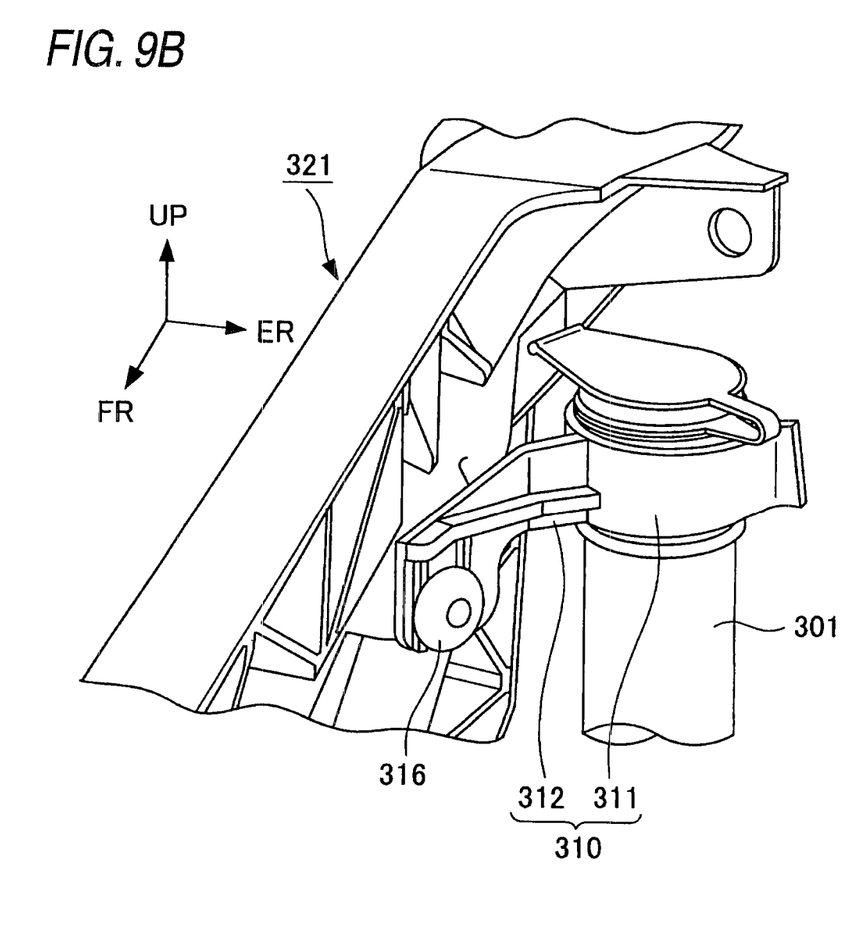

Specifically, the bracket 310 has a washer inlet gripping portion 311, an attaching leg portion 312, and an attaching surface portion 313. The washer inlet gripping portion 311 is such that a strip-like member is formed into an arc-like shape. The attaching leg portion 312 has a plate-like shape, and the washer inlet gripping portion 311 is connected to one end portion side of the attaching leg portion 312. The attaching surface portion 313, which is molded into a planar shape, is provided on the other end portion side of the attaching leg portion 312. A projecting portion 315 and a through hole 314 are provided on the attaching surface portion 313. An attached surface portion 322, which is molded into a planar shape, is provided on the vehicle structural body 321. The attached surface portion 322 is adapted to be brought into surface contact with the attaching surface 313 of the bracket 310. A fixing hole 323 and a positioning hole 324 are provided in the attached surface portion 322.

When the washer inlet 301 is attached to the vehicle structural body 321 by the bracket 310, firstly, the washer inlet gripping portion 311 of the bracket 310 is fixed to the washer inlet 301. Following this, the projecting portion 315 of the bracket 310 is inserted into the positioning hole 324 in the vehicle structural body 321, so that the attaching surface portion 313 of the bracket 310 and the attached surface portion 322 of the vehicle structural body 321 are brought into surface contact with each other. In this state, the bracket 310 is fixed to the vehicle structural body 321 with the fixing tool 316. This allows the washer inlet 301 to be attached to the vehicle structural body 321 via the bracket 310.

A washer tank attaching structure described in JP-A-7-329733 is raised as another approach. In this washer tank attaching structure, by making use of a bracket in which a locking portion having a connection hole opened therein is provided on a holder portion which is formed into an arc-like shape, an inlet portion (a washer inlet) is attached to a vehicle body structure (a vehicle structural body).

In the washer inlet attaching structure described first above, however, the operations of positioning the bracket 310, bringing the attaching surface portion 313 into surface contact with the attached surface portion 322 and fixing the bracket 310 with the fixing tool 316 needed to be performed, and these operations were complex and troublesome. In addition, places where to dispose the washer tank differs from model line to model line and hence, washer inlets of different shapes need to be attached to different attaching places. Because of this, different brackets need to be prepared to match corresponding model lines, and this reduces the versatility and calls for an increase in manufacturing costs. Further, since a washer tube (not shown) also needs to be fixed to the bracket 310 with a clip or the like, the number of parts is increased.

As with the washer inlet attaching structure that has just been described above, also in the washer tank attaching structure described in JP-A-7-329733, washer inlets of different shapes need to be prepared for different model lines. Because of this, brackets of different shapes need to be prepared for different model lines, and this reduces the versatility and calls for an increase in manufacturing costs.

SUMMARY OF THE INVENTION

According to an aspect of the invention, there is provided a washer inlet attaching structure, configured to attach a washer inlet to a vehicle structural body made of resin, the washer inlet communicating with a tank main body adapted to store a windshield washer fluid and guiding the windshield washer fluid into the tank main body, the washer inlet attaching structure including a washer inlet holding portion, configured to hold the washer inlet, the washer inlet holding portion being molded integrally with the vehicle structural body.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIGS. 3A and 3B are explanatory diagrams of the washer inlet attaching structure according to the first embodiment of the invention, of which FIG. 3A shows a state resulting before a washer inlet is attached and 3B shows a state resulting after the washer inlet is attached;

FIGS. 7A and 7B are explanatory diagrams of the washer inlet attaching structure according to the second embodiment of the invention, of which FIG. 7A shows a state resulting before a washer inlet is attached and 7B shows a state resulting after the washer inlet is attached;

FIGS. 8A and 8B are explanatory diagrams of a cap's open-state holding tool included in the washer inlet attaching structure according to the second embodiment of the invention, of which FIG. 8A shows a state in which an opening in the washer inlet is closed by a cap and FIG. 8B shows a state in the opening in the washer inlet is opened; and FIGS. 9A and 9B are explanatory diagrams of a related-art washer inlet attaching structure, of which FIG. 9A shows a state resulting before a washer inlet is attached and FIG. 9B shows a state resulting after the washer inlet is attached.

DETAILED DESCRIPTION OF THE INVENTION

A best mode for carrying out a washer inlet attaching structure according to the invention will be described specifically based on embodiments thereof.

A washer inlet attaching structure according to a first embodiment of the invention will be described by reference to FIGS. 1, 2, 3A and 3B.

Figure 1:
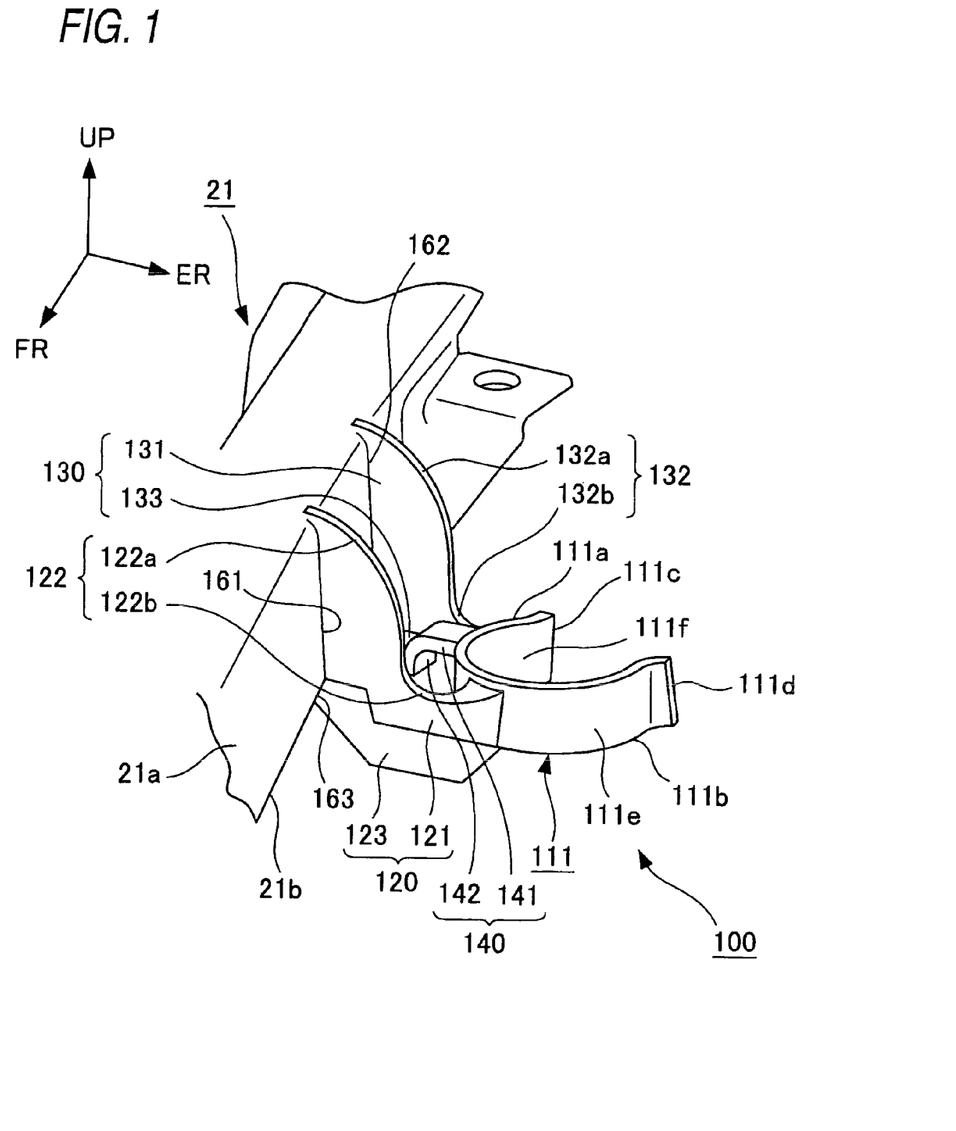
FIG. 1 is a perspective view of a washer inlet attaching structure according to a first embodiment of the invention.
Figure 2:
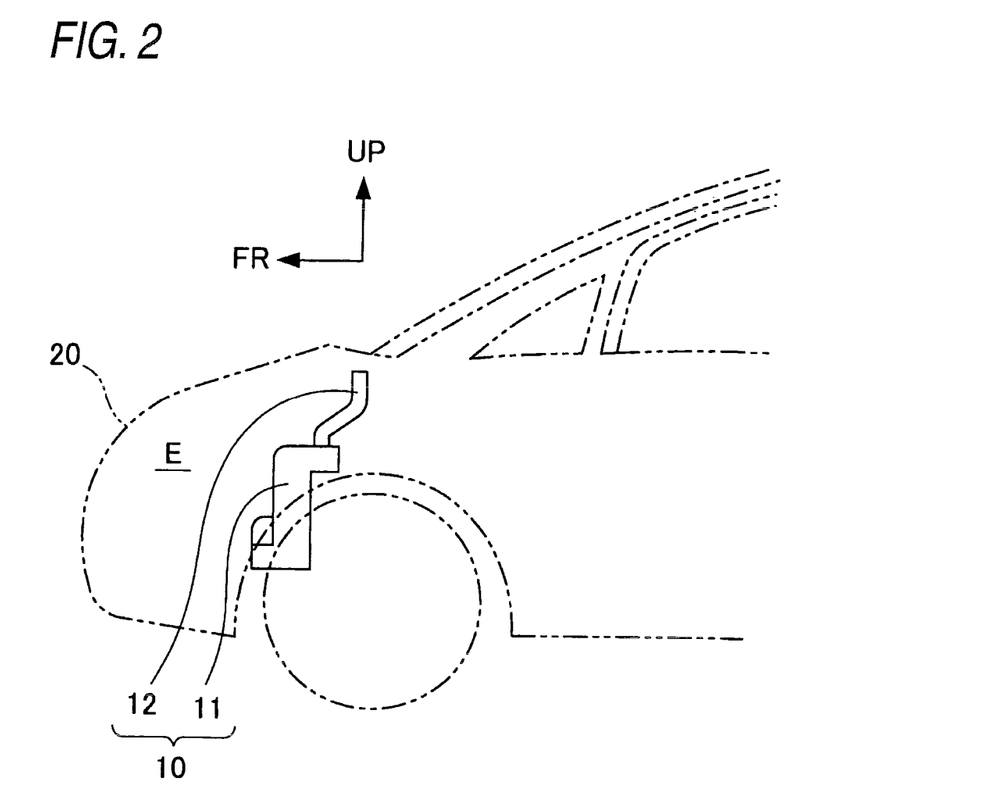
FIG. 2 is a side view of a vehicle showing where to dispose a washer tank in the vehicle.
Figure 3A:
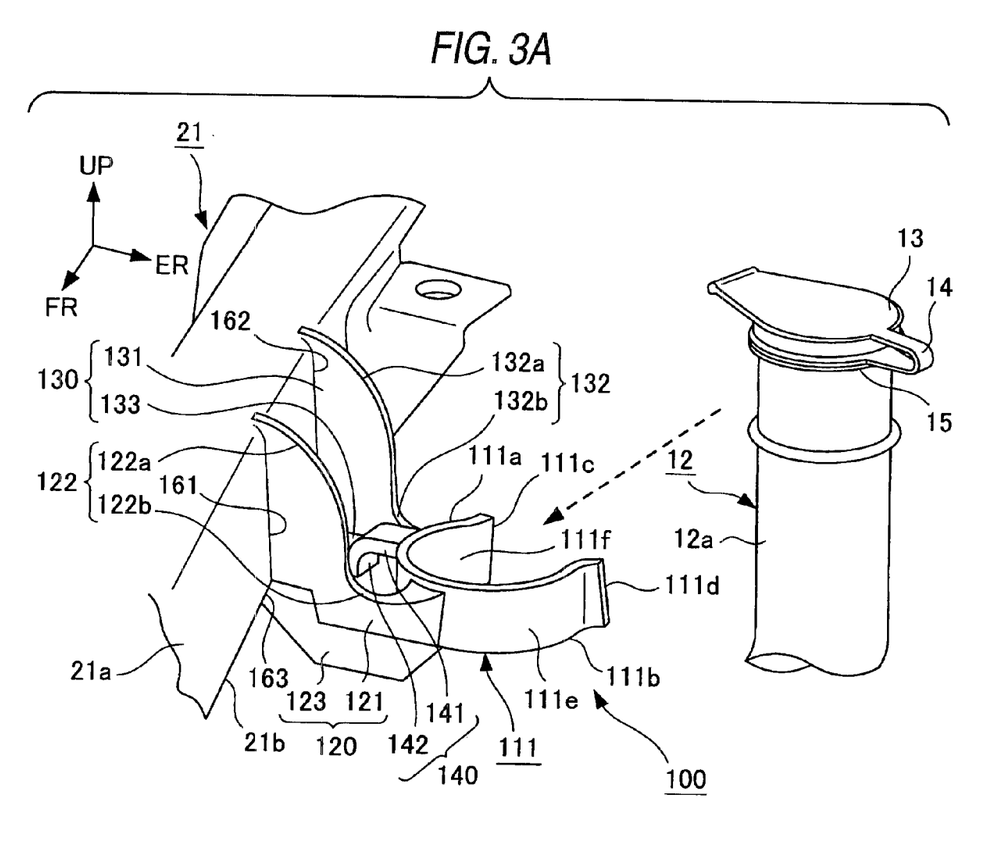
Figure 3B:
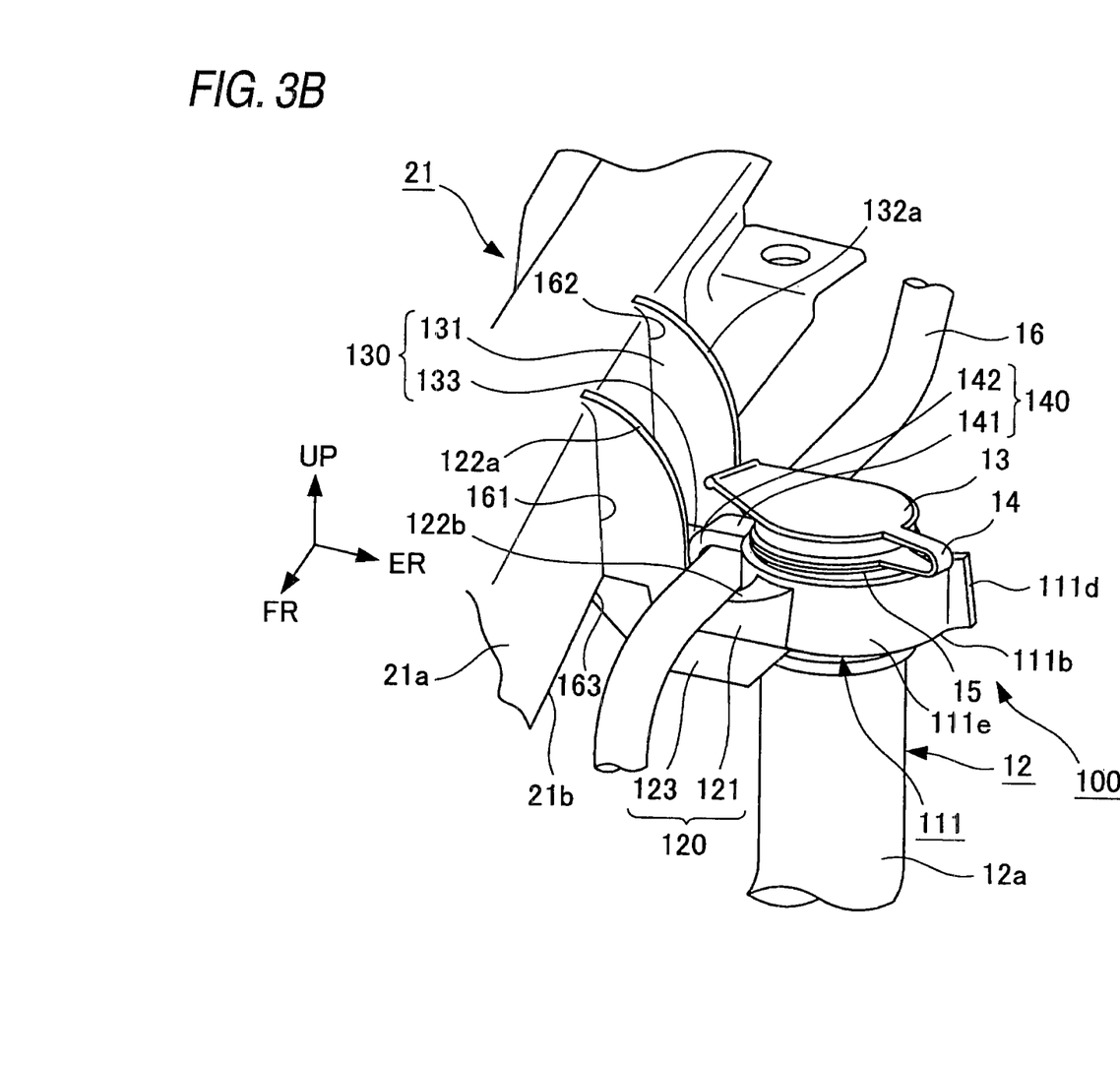

FIG. 1 is a perspective view of a washer inlet attaching structure according to a first embodiment of the invention, FIG. 2 is a side view of a vehicle showing where to dispose a washer tank in the vehicle, FIGS. 3A and 3B are explanatory diagrams of the washer inlet attaching structure according to the first embodiment of the invention, of which FIG. 3A shows a state resulting before a washer inlet is attached and 3B shows a state resulting after the washer inlet is attached. In FIGS. 1, 2, 3A and 3B, a line with an arrow FR denotes a direction of the front of the vehicle, and a line with an arrow UP denotes a direction of the rear of the vehicle. In FIGS. 1, 3A and 3B, a line with an arrow ER denotes a direction of an interior of an engine compartment.

In this embodiment, as is shown in FIG. 2, a washer tank 10 is disposed in an interior of an engine compartment E of a vehicle 20. The washer tank 10 includes a tank main body 11 and a washer inlet 12 (a pouring pipe) which is provided in such a manner as to communicate with the tank main body 11. The tank main body 11 is attached to a vehicle structural body (not shown). The washer inlet 12 is attached to an upper frame inner (a vehicle structural body) 21 which extends in a vehicle front-rear or longitudinal direction on a side portion of the vehicle and in the vicinity of an upper portion of the engine compartment E (refer to FIGS. 1, 3A and 3B). A windshield washer fluid of the vehicle is stored in the tank main body 11. The washer inlet 12 guides the windshield washer fluid into an interior of the tank main body 11.

As is shown in FIGS. 1, 3A and 3B, the washer inlet attaching structure according to the first embodiment has a washer inlet holder 100 (a washer inlet holding portion) which is formed integrally with the upper frame inner 21. The upper frame inner 21 and the washer inlet holder 100 are molded of a resin.

The washer inlet holder 100 has a washer inlet gripping portion 111, a first intermediate portion 120, a second intermediate portion 130 and a tube holding portion 140.

The washer inlet gripping portion 111 is molded as looking like a strip-like member extends into an arc-like shape. Specifically, the washer inlet gripping portion 111 is molded into a shape in which an inner wall portion 111f thereof contacts a circumferential wall portion 12a of the washer inlet 12 in a circumferential direction thereof. Both end portions 111c, 111d of the washer inlet gripping portion 111 are spaced apart on a side which faces the rear of the vehicle. Namely, the washer inlet gripping portion 111 is molded into a shape in which the washer inlet gripping portion 111 is opened on the side facing the rear of the vehicle. Further, in positions in the vicinity of the end portions 111c, 111d thereof, the washer inlet gripping portion 111 is formed into a shape in which the washer inlet gripping portion 111 extends outwards while being bent in that direction. By this configuration, when the washer inlet 12 is attached to the washer inlet gripping portion 111, by the washer inlet 12 being brought into contact with both the end portions 111c, 111d of the washer inlet gripping portion 111, the washer inlet 12 is restrained from being caught at the entrance to the washer inlet gripping portion 111. As a result, the washer inlet 12 can be guided smoothly into the washer inlet gripping portion 111 from a rear side of the vehicle so that the washer inlet 12 can easily be attached therein.

The first intermediate portion 120 is such as to be interposed between the washer inlet gripping portion 111 and the upper frame inner 21. The first intermediate portion 120 is molded into a plate-like shape and is made up of two members such as an intermediate member 121 and a reinforcement member 123. A boundary portion 161 between one end portion side of the intermediate member 121 and a side wall portion 21a of the upper frame inner 21 is formed rectilinearly. The other end portion side of the intermediate member 121 is connected to an outer wall portion 111e of the washer inlet gripping portion 111. The reinforcement member 123 is connected to a lower portion of the intermediate member 121, a lower wall portion 21b of the upper frame inner 21 and a lower portion 111b of the washer inlet gripping portion 111 and is such as to function as a reinforcement material of the intermediate member 121. A boundary portion 163 between one end portion side of the reinforcement member 123 and the lower wall portion 21b of the upper frame inner 21 is formed rectilinearly. By the boundary portions 161, 163 being formed rectilinearly in the way described above, the rigidity at the boundary portions can be ensured.

An upper wall portion 122 of the intermediate member 121 extends from one end portion side (a side facing the upper frame inner 21) to the other end portion side (a side facing the washer inlet gripping portion 111) while extending downwards of the vehicle and has a first arc portion 122a which is formed into an arc-like shape which projects upwards of the vehicle. Further, the upper wall portion 122 of the intermediate member 121 continues to the first arc portion 122a, extends from the one end portion side (the side acing the upper frame inner 21) to the other end portion side (the side facing the washer inlet gripping portion 111) while extending upwards of the vehicle, and has a second arc portion 122b which is formed into an arc portion which projects downwards of the vehicle. In addition, the second arc portion 122b constitutes a tube supporting portion for supporting a washer tube, which will be described in detail later.

As with the first intermediate portion 120, the second intermediate portion 130 is such as to be interposed between the washer inlet gripping portion 111 and the upper frame inner 21. The second intermediate portion 130 is molded into a plate-like shape, is molded in a position lying further rearwards than the first intermediate portion 120 in the vehicle longitudinal direction, and is made up of two members such as an intermediate member 131 and a reinforcement member 133. A boundary portion 162 between one end portion side of the intermediate member 131 and the side wall portion 21a of the upper frame inner 21 is formed rectilinearly. The other end portion side of the intermediate member 131 is connected to the outer wall portion 111e of the washer inlet gripping portion 111. The reinforcement member 131 is connected to a lower portion of the intermediate member 131, the lower wall portion 21b of the upper frame inner 21 and the lower portion 111b of the washer inlet gripping portion 111 and is such as to function as a reinforcement material of the intermediate member 131. A boundary portion (not shown) between one end portion side of the reinforcement member 133 and the lower wall portion 21b of the upper frame inner 21 is also formed rectilinearly. By the boundary portion 162 and the boundary portion just described above being formed rectilinearly, the rigidity at the boundary portion 162 and the boundary portion, not shown, can be ensured.

An upper wall portion 132 of the intermediate member 131 has a first arc portion 132a which is formed into an arc-like shape which extends from one end portion side (a side facing the upper frame inner 21) to the other end portion side (a side facing the washer inlet gripping portion 111) while extending downwards of the vehicle so as to project upwards of the vehicle. Further, the upper wall portion 132 of the intermediate member 131 has a second arc portion 132b which is formed into an arc-like portion which continues to the first arc portion 132a and extends from the one end portion side (the side facing the upper frame inner 21) to the other end portion side (the side facing the washer inlet gripping portion 111) while extending upwards of the vehicle so as to project downwards of the vehicle. In addition, the second arc portion 132b constitutes a tube supporting portion for supporting the washer tube which will be described in detail later.

A tube holding portion 140 is molded in such a manner as to connect to the outer wall portion 111e of the washer inlet gripping portion 111. Specifically, the tube holding portion 140 is molded in such a manner as to connect to the outer wall portion 111e of the washer inlet gripping portion 111 between a connecting portion with the first intermediate portion 120 and a connecting portion with the second intermediate portion 130 and in the vicinity of an upper end portion 111a of the washer inlet gripping portion. The tube holding portion 140 has a horizontal portion 141 which connects to the outer wall portion 111e of the washer inlet gripping portion 111 at a proximal end portion side and extends in a substantially horizontal direction and a bent portion 142 which continues to a distal end of the horizontal portion 141 and extends downwards while being bent in that direction. By the tube holding portion 140 which is shaped in the way described above being molded integrally with the washer inlet gripping portion 111, the necessity of a holder for holding a washer tube 16 is obviated, thereby making it possible to reduce the number of parts. Further, the washer tube 16 can be held by the tube holding portion 140 without using the holder, whereby the attaching work becomes simple, and the working properties are increased.

Here, attaching work of the washer inlet 12 to the upper frame inner 21, which constitutes the vehicle structural body, by the use of the washer inlet attaching structure which is configured as has been described heretofore will be describe by reference FIGS. 3A and 3B. Note that reference numeral 13 denotes a cap, reference numeral 14 denotes a hinge, and reference numeral 15 denotes a cap fixing portion. The cap 13 is connected with the cap fixing portion 15 via the hinge 14.

Firstly, as is shown in FIG. 3A, the washer inlet 12 is positioned at the side of the washer inlet gripping portion 111 which faces the rear of the vehicle. Following this, as is shown in FIG. 3B, the washer inlet 12 is attached to the washer inlet gripping portion 111. In addition, the washer tube 16 is positioned below the horizontal portion 141 of the tube holding portion 140 and is positioned above the second arc portion 132b of the second intermediate portion 130.

Consequently, the washer inlet 12 is held in the washer inlet gripping portion 111, and the washer tube 16 is supported by the tube holding portion 140 and the second arc portions 122b, 132b. In other words, the washer inlet 12 and the washer tube 16 are fixed to the upper frame inner 21 by the washer inlet holder 100.

Consequently, according to the washer inlet attaching structure according to this embodiment, the washer inlet holder 100 is molded integrally with the upper frame inner 21, which provides the relatively simple structure and increases the assembling accuracy. Positioning work of positioning the washer inlet holder 100 relative to the upper frame inner 21 does not have to be performed, and the washer inlet 12 can easily be attached to the washer inlet holder 100, which increases the attaching properties. In addition, compared with the washer inlet attaching structure in which the bracket is attached with the clip, the number of parts involved can be reduced.

By the boundary portions 161, 162 being formed in the two locations, the strength of the washer inlet holder 100 itself can be increased.

By the washer inlet holder 100 being made up of the first and second intermediate portions 120, 130, and the washer inlet gripping portion 111 having the shape in which the strip-like member extends into the arc shape, the washer inlet 12 can be attached to the upper frame inner 21 only by inserting the washer inlet 12 into the washer inlet gripping portion 111, and compared with the washer inlet attaching structure in which the bracket is attached with the clip, the attaching properties are increased. Further, the number of parts can be reduced.

By the second arc portions 122b, 132b being provided on the first and second intermediate portions 120, 130, respectively, when the washer tube 16 is attached to the tube holding portion 140, the washer tube 16 can be supported from therebelow, whereby the washer tube 16 can be attached to the washer inlet holder 100 in an ensured fashion.

A washer inlet attaching structure according to a second embodiment of the invention will be described by reference to FIGS. 4, 5, 6, 7A and 7B, and 8A and 8B.

Figure 4:
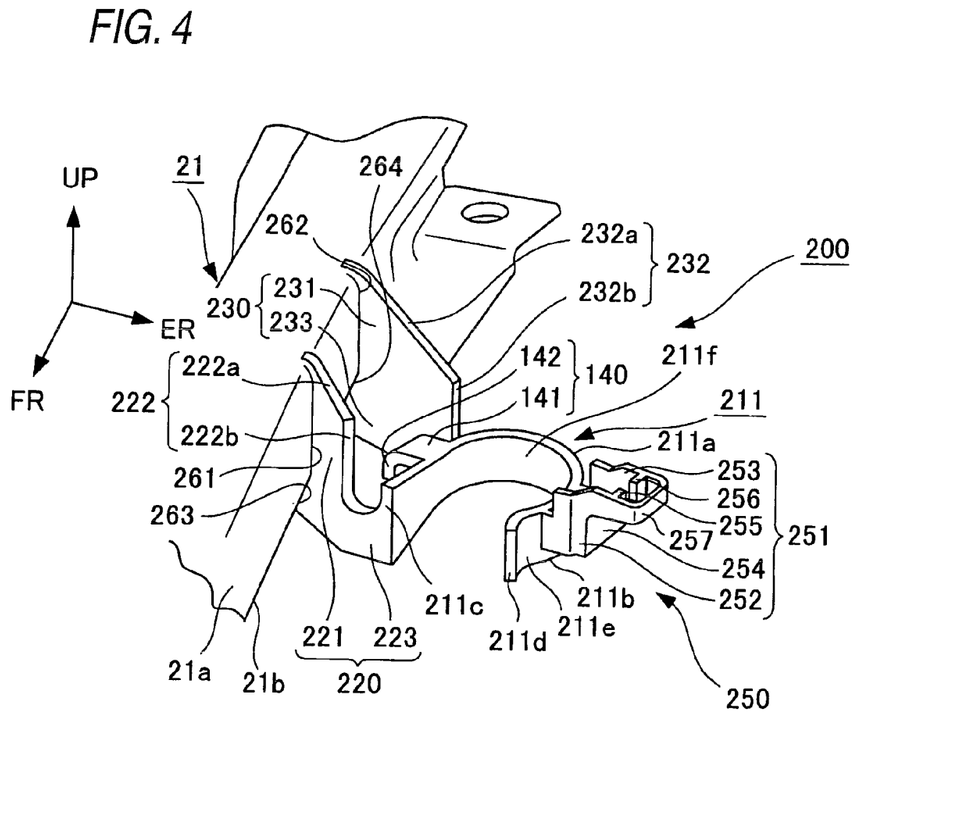
FIG. 4 is a perspective view of a washer inlet attaching structure according to a second embodiment of the invention.
Figure 5:
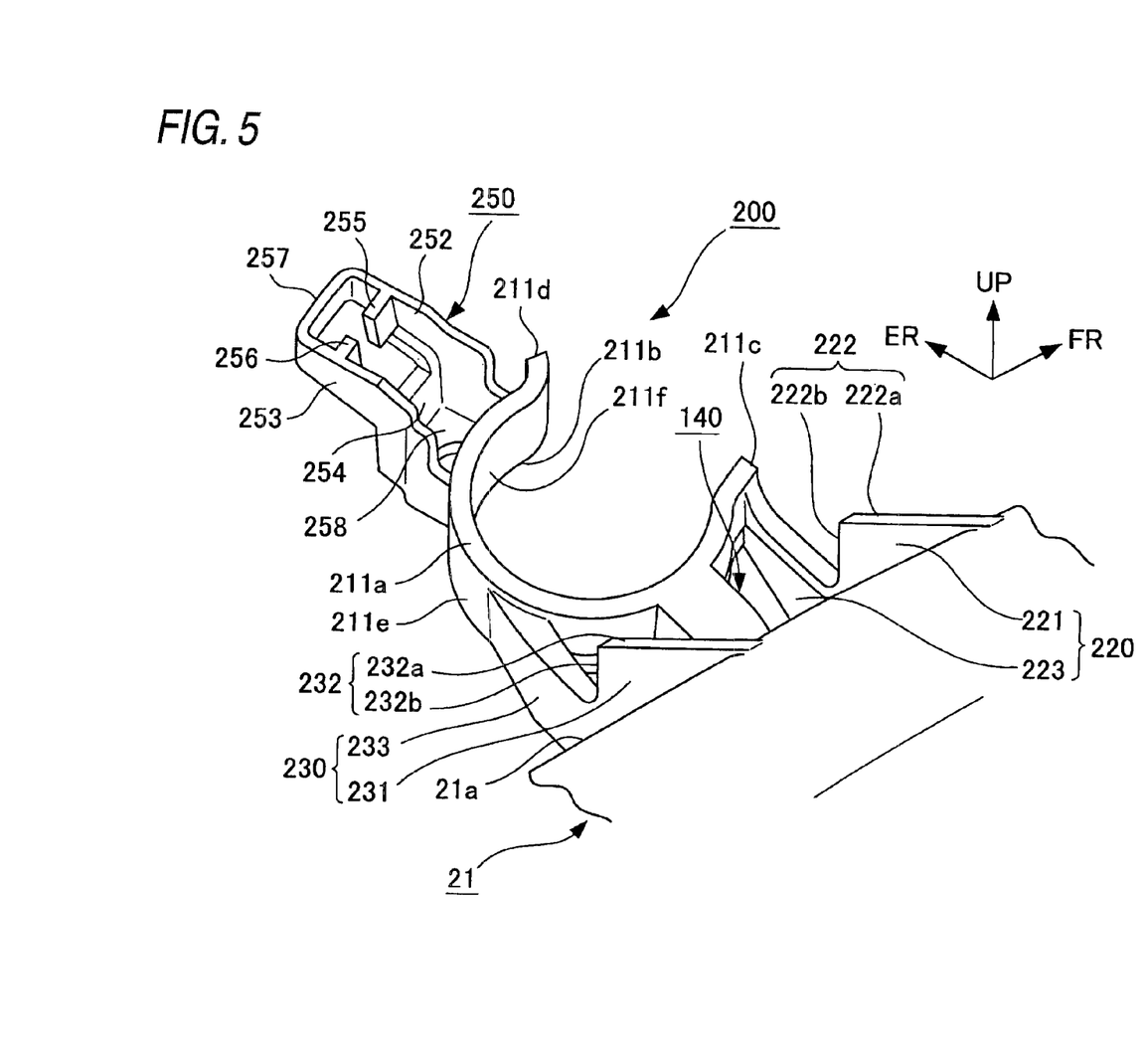
FIG. 5 is a perspective view of the waster inlet attaching structure according to the second embodiment of the invention.
Figure 6:
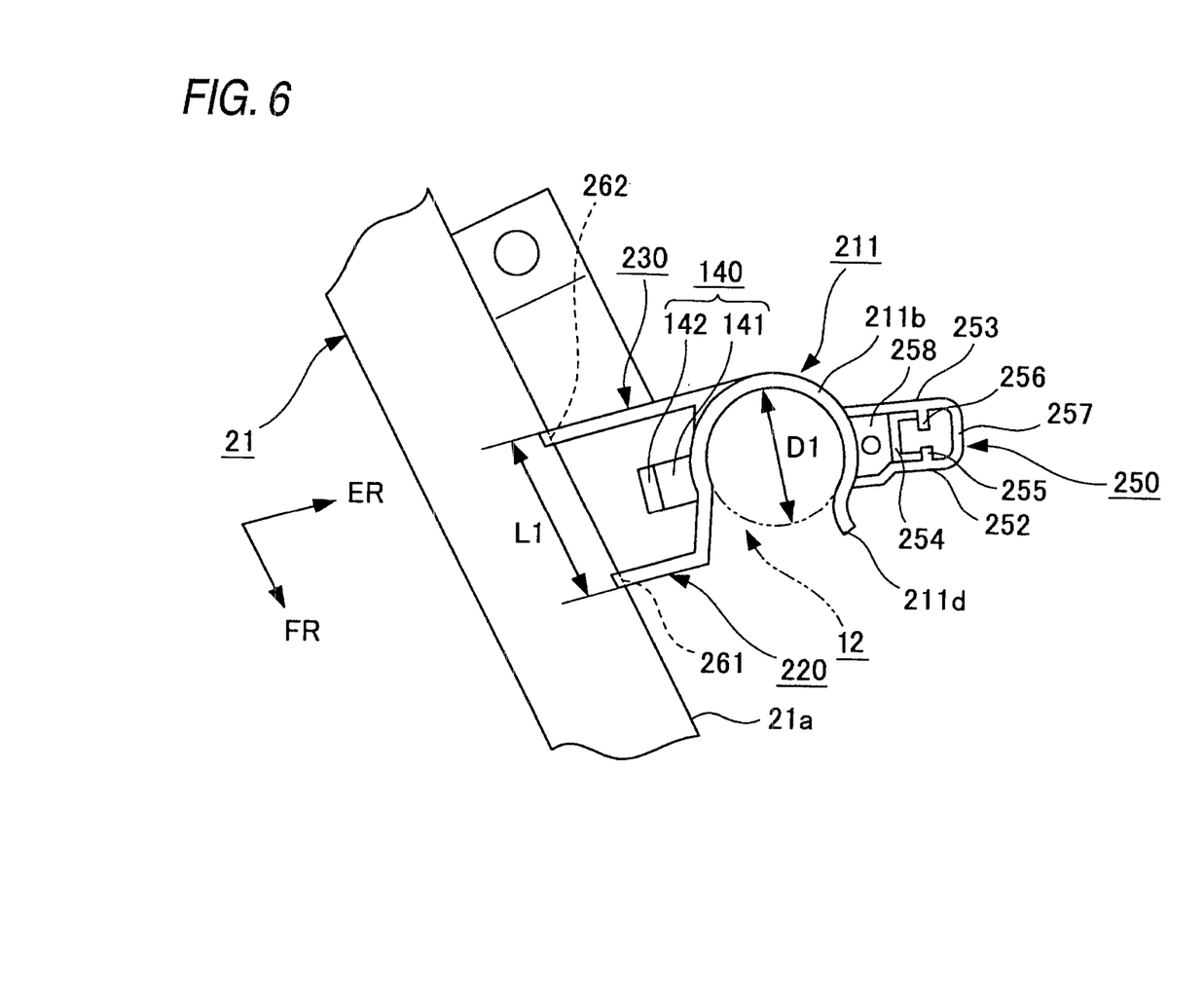
FIG. 6 is a bottom view of the washer inlet attaching structure according to the second embodiment of the invention.
Figure 7A:
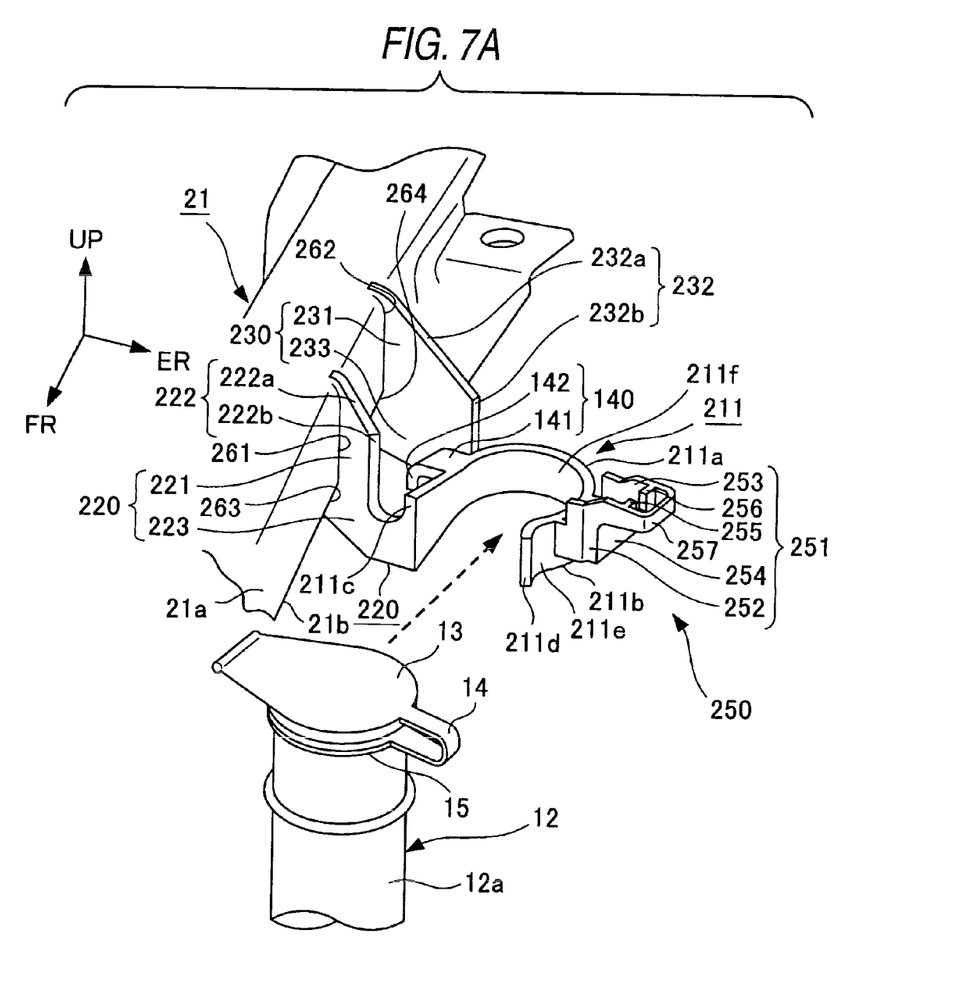
Figure 7B:
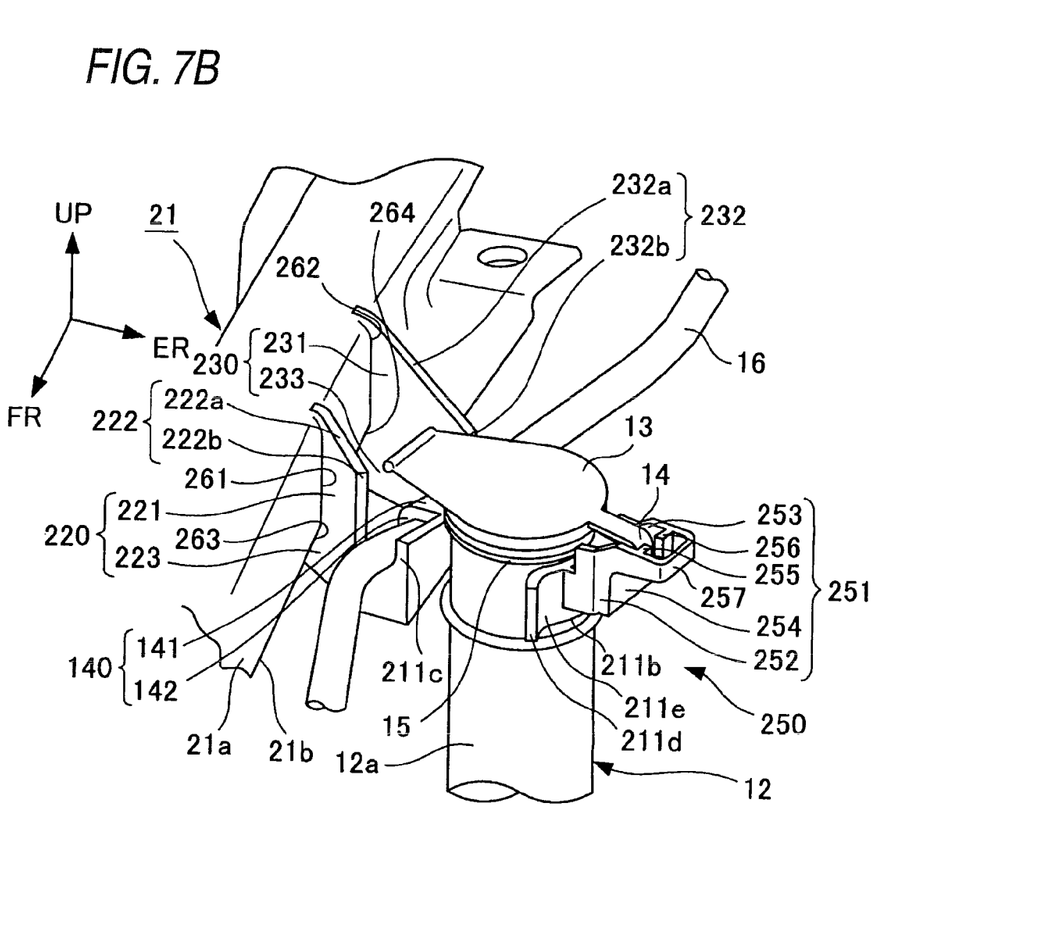
Figure 8A:
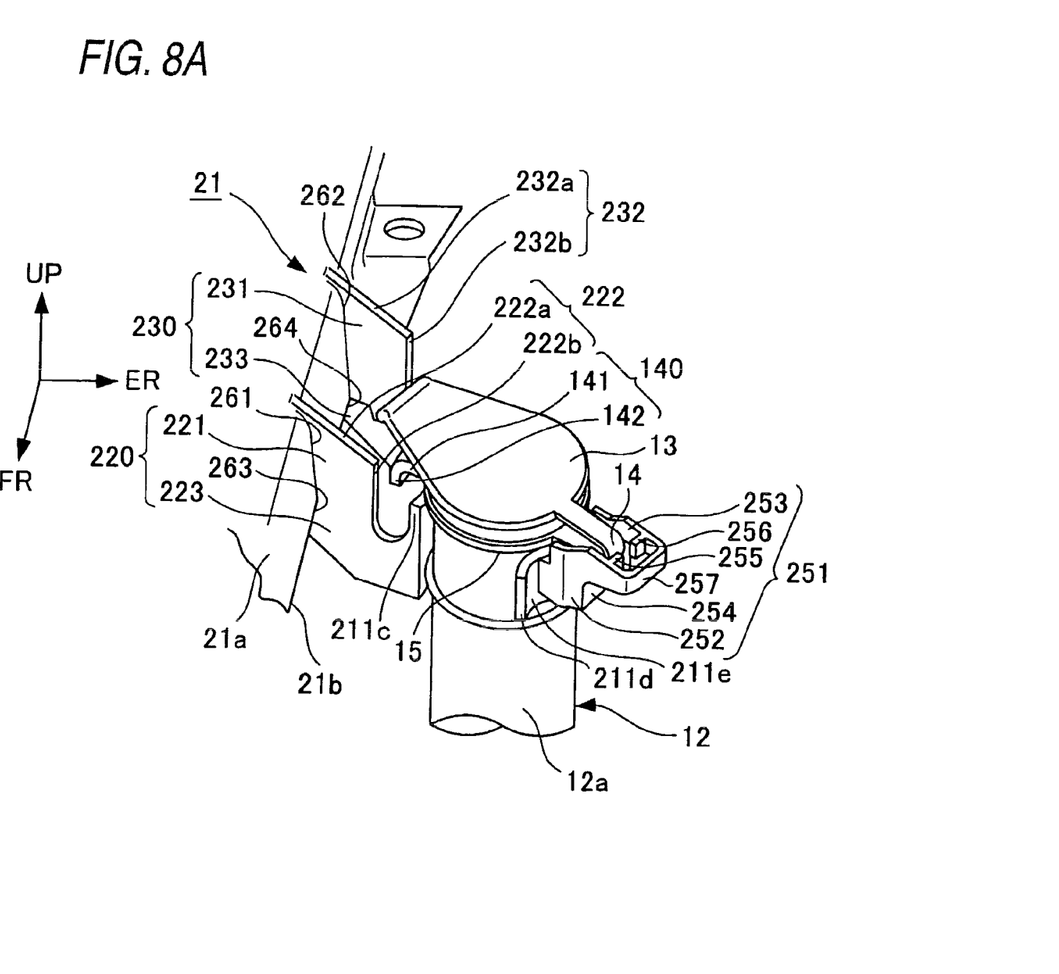
Figure 8B:
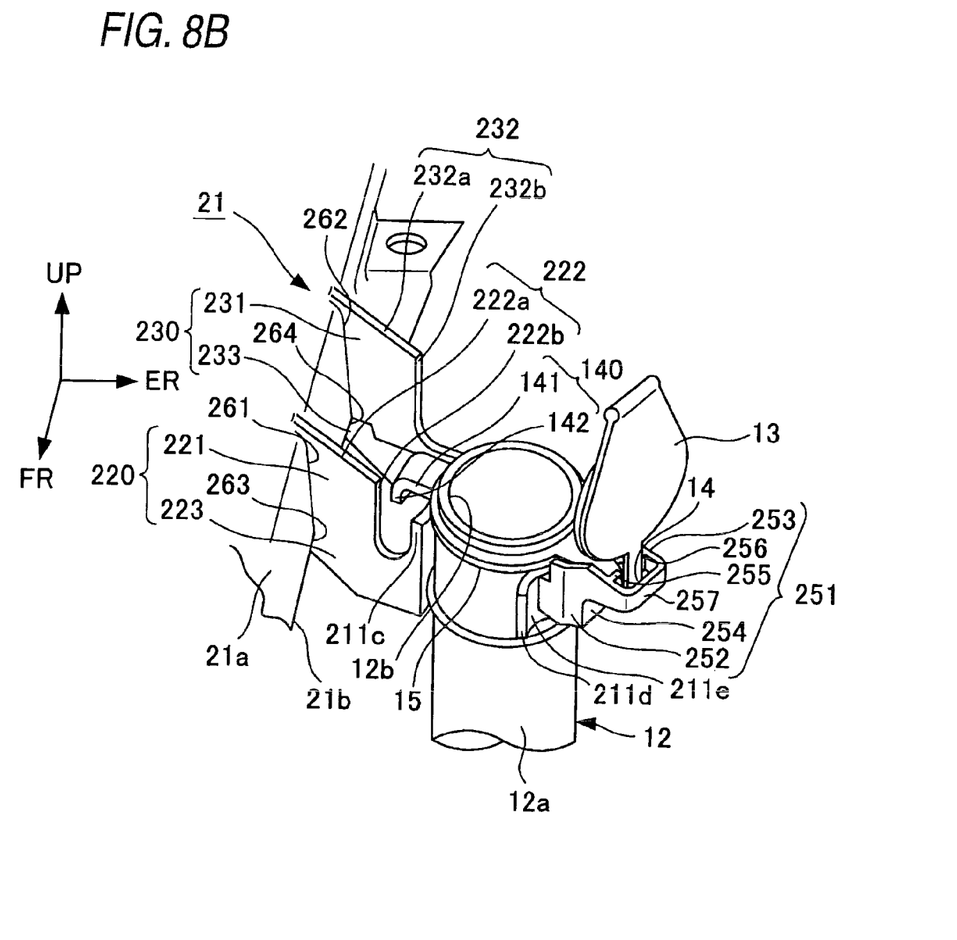

FIGS. 4 and 5 are perspective views of a washer inlet attaching structure according to a second embodiment of the invention, FIG. 6 is a bottom view of the washer inlet attaching structure according to the second embodiment of the invention, FIGS. 7A and 7B are explanatory diagrams of the washer inlet attaching structure according to the second embodiment of the invention, of which FIG. 7A shows a state resulting before a washer inlet is attached and 7B shows a state resulting after the washer inlet is attached, and FIGS. 8A and 8B are explanatory diagrams of a cap's open-state holding tool included in the washer inlet attaching structure according to the second embodiment of the invention, of which FIG. 8A shows a state in which an opening in the washer inlet is closed by a cap and FIG. 8B shows a state in the opening in the washer inlet is opened. In FIGS. 4, 5, 6, 7A and 7B, and 8A and 8B, a line with an arrow FR denotes a direction of the front of the vehicle, and a line with an arrow ER denotes a direction of an interior of an engine compartment. In FIGS. 4, 5, 7A and 7B, and 8A and 8B, a line with an arrow UP denotes a direction oriented upwards of the vehicle.

This second embodiment differs from the first embodiment in that the opening location of the washer inlet gripping portion included in the washer inlet attaching structure of the latter is changed, the shapes of the first and second connecting portion in the same attaching structure are changed and a cap's open-state holder is additionally provided to the attaching structure and has the same component elements (including the tube holding portion) other than those changed and added.

In the second embodiment, like reference numerals will be given to like constituent elements to those of the washer inlet attaching structure according to the first embodiment that has been described above, and the description thereof will be omitted.

As is shown in FIGS. 4 and 5, a washer inlet attaching structure of this embodiment has a washer inlet attachment 200 which is formed integrally with an upper frame inner 21. The upper frame inner 21 and the washer inlet attachment 200 are molded of a resin.

The washer inlet attachment 200 has a washer inlet gripping portion 211, a first intermediate portion 220, a second intermediate portion 230, a tube holding portion 140, and a cap's open-state holder 250.

The washer inlet gripping portion 211 is molded as looking like a strip-like member extends into an arc-like shape. Specifically, the washer inlet gripping portion 211 is molded into a shape in which an inner wall portion 211 thereof contacts a circumferential wall portion 12a of a washer inlet 12 (refer to FIGS. 7A and 7B, and FIGS. 8A and 8B) in a circumferential direction thereof. Both end portions 211c, 211d of the washer inlet gripping portion 211 are spaced apart at a side which faces the front of the vehicle. Namely, the washer inlet gripping portion 211 is molded into a shape in which the washer inlet gripping portion is opened at the side which faces the front of the vehicle. Further, the washer inlet gripping portion 211 is molded into a shape in which the washer inlet gripping portion 211 extends outwards while being bent in that direction in the vicinity of the one end portion 211d. By this configuration, when the washer inlet 12 is attached to the washer inlet gripping portion 211, the washer inlet 12 is restrained from being caught at the one end portion 211d as a result of being brought into contact therewith. As a result, the washer inlet 12 can be smoothly guided into the washer inlet gripping portion 211 from a front side of the vehicle so that the washer inlet 12 can easily be attached to the washer inlet gripping portion 211.

The washer inlet gripping portion 211 connects to the upper frame inner 21 via the first intermediate portion 220 and the second intermediate portion 230. A distal end portion of the tube holding portion 140 connects to an outer wall portion 211e of the washer inlet gripping portion 211. The cap's open-state holder 250 is molded integrally with the washer inlet gripping portion 211 in a position on the outer wall portion 211e of the washer inlet gripping portion 21 which lies to confront the tube holding portion 140.

The first intermediate portion 220 is such as to be interposed between the washer inlet gripping portion 211 and the upper frame inner 21. The first intermediate portion 220 is molded into a plate-like shape and is made up of two members such as an intermediate member 221 and a reinforcement member 223. A boundary portion 261 between one end portion side of the intermediate member 221 and a side wall portion 21a of the upper frame inner 21 is formed rectilinearly. The other end portion side of the intermediate member 221 connects to the outer wall portion 211e of the washer inlet gripping portion 211. The reinforcement member 223 connects to a lower portion of the intermediate member 221, a lower wall portion 21b of the upper frame inner 21, and a lower portion 211b of the washer inlet gripping portion 221 and is such as to function as a reinforcement member of the intermediate member 221. A boundary portion 263 between the one end portion side of the reinforcement member 223 and the lower wall portion 21b of the upper frame inner 21 is formed rectilinearly. By the boundary portions 261, 263 being formed rectilinearly in the way described above, the rigidity at the boundary portions 261, 263 can be ensured.

An upper wall portion 222 of the intermediate member 221 has an inclined portion 222a which is formed to extend from one end portion side (a side facing the upper frame inner 21) to the other end portion side (a side facing the washer inlet gripping portion 211) while extending obliquely downwards of the vehicle. Further, the upper wall portion 222 of the intermediate member 221 has an arc portion 222b which is formed into an arc-like shape which continues to the inclined portion 222a and extends from the one end portion side (the side facing the upper frame inner 21) to the other end portion side (the side facing the washer inlet gripping portion 211) so as to project downwards of the vehicle. In addition, the arc portion 222b constitutes a tube supporting portion for supporting a washer tube, which will be described in detail later.

As with the first intermediate portion 220, the second intermediate portion 230 is such as to be interposed between the washer inlet gripping portion 211 and the upper frame inner 21. The second intermediate portion 230 is molded into a plate-like shape, is molded in a position lying further rearwards than the first intermediate portion 220 in the vehicle longitudinal direction, and is made up of two members such as an intermediate member 231 and a reinforcement member 233. A boundary portion 262 between one end portion side of the intermediate member 231 and the side wall portion 21a of the upper frame inner 21 is formed rectilinearly. The other end portion side of the intermediate member 231 connects to the outer wall portion 211e of the washer inlet gripping portion 211. The reinforcement member 233 connects to a lower portion of the intermediate member 231, the lower wall portion 21b of the upper frame inner 21 and the lower portion 211b of the washer inlet gripping portion 211 and is such as to function as a reinforcement material of the intermediate member 231. A boundary portion 264 between one end portion side of the reinforcement member 233 and the lower wall portion 21b of the upper frame inner 21 is also formed rectilinearly. By the boundary portions 262, 264 being formed rectilinearly, the rigidity at the boundary portions 262, 264 can be ensured.

An upper wall portion 232 of the intermediate member 231 has an inclined portion 232a which is formed to extend from one end portion side (a side facing the upper frame inner 21) to the other end portion side (a side facing the washer inlet gripping portion 211) while extending obliquely downwards of the vehicle. Further, the upper wall portion 232 of the intermediate member 221 has an arc portion 232b which is formed into an arc-like shape which continues to the inclined portion 232a and extends from the one end portion side (the side facing the upper frame inner 21) to the other end portion side (the side facing the washer inlet gripping portion 211) so as to project downwards of the vehicle. In addition, the second arc portion 232b constitutes a tube supporting portion for supporting the washer tube, which will be described in detail later.

A distance L1 between the boundary portions 261 and the boundary portion 262 that have been described above is, as is shown in FIG. 6, becomes almost the same as a diameter D1 of the washer inlet 12. In other words, the two boundary portions 261, 262 are separated by the distance almost equal to the diameter D1 of the washer inlet 12. By this configuration, the holding rigidity of the washer inlet attachment 200 is increased.

Here, work of attaching the washer inlet 12 to the upper frame inner 21 by the use of the washer inlet attaching structure which is configured as has been described heretofore will be described by reference to FIGS. 7A and 7B.

Firstly, as is shown in FIG. 7A, the washer inlet 12 is positioned at the vehicle front side of the washer inlet gripping portion 211. Following this, as is shown in FIG. 7B, the washer inlet 12 is attached to the washer inlet gripping portion 211. In addition, the washer tube 16 is positioned below the horizontal portion 141 of the tube holding portion 140 and is positioned above the arc portion 222b of the first intermediate portion 220 and above the arc portion 232b of the second intermediate portion 230.

Thus, the washer inlet 12 is held in the washer inlet gripping portion 211, and the washer tube 16 is supported by the tube holding portion 140 and the arc portions 222b, 232b. In other words, the washer inlet 12 and the washer tube 16 are fixed to the upper frame inner 21 by the washer inlet attachment 200.

As is shown in FIGS. 4, 5, 6, the cap's open-state holder 250 is formed substantially into a box shape which is opened upwards. The cap's open-state holder 250 has a hinge accommodation portion 251 which accommodates the hinge 14 in a cap closed state. Further, the cap's open-state holder 250 has projecting portions 255, 256 which locks and supports the hinge 14 in a cap open state. The hinge accommodation portion 251 is surrounded by side wall portions 252, 253, a supporting portion 254 and the projecting portions 255, 256. The side wall portions 252 are molded in such a manner as to connect to the outer wall portion 211e of the washer inlet gripping portion 211. The side wall portion 252 and the side wall portion 253 are molded in such a manner as to confront each other. The side wall portions 252, 253 are formed into plate-like shapes, in which a proximal end portion side (a side facing the washer inlet gripping portion 211) is made higher than a distal end portion side. The supporting portion 254 is molded in such a manner as to connect to the side wall portions 252, 253 between the proximal end portion side and the distal end portion side of the side wall portions 252, 253. The projecting portions 255, 256 are molded in such a manner as to connect to the side wall portions 252, 253, respectively. The projecting portion 255 and the projecting portion 256 are molded in such a manner as to confront each other and are molded in such a manner that distal ends thereof are spaced apart from each other. The side wall portion 252 and the side wall portion 253 connect to the side wall portion 257 at distal ends thereof. A bottom wall portion 258 is connected to lower portions at the proximal end portion side (the side facing the washer inlet gripping portion 211) of the side wall portion 252 and the side wall portion 253.

By the cap's open-state holder 250 that is configured as has been described above being molded in such a manner as to connect to the washer inlet gripping portion 211, as is shown in FIG. 8A, with the opening at the upper end of the washer inlet 12 closed by the cap 13, the hinge 14 is accommodated in the hinge accommodating portion 251. In addition, as is shown in FIG. 8B, when the opening 12b at the upper end of the washer inlet 12 is opened, the cap 13 is removed from the opening 12b of the washer inlet 12, and the hinge 14 is inclined at an angle larger than about 90 degrees, whereby the hinge 14 is locked and held by the projecting portions 255, 256, whereby the state is maintained in which the opening 12b at the upper end of the washer inlet 12 is opened. This allows a windshield washer fluid to be poured into the washer tank main body through the washer inlet 12.

Consequently, according to the washer inlet attaching structure according to the embodiment, as with the washer inlet attaching structure according to the first embodiment, the washer inlet attaching structure becomes a relatively simple structure, and the assembling accuracy is increased. The washer inlet holder 200 does not have to be positioned relative to the upper frame inner 21, and hence, the washer 12 can easily be attached to the washer inlet holder 200, this increasing the attaching properties. In addition, compared with the washer inlet attaching structure in which the bracket is attached by the clip, the number of component elements can be reduced.

Further, with the cap's open-state holder 250 provided, when pouring the windshield washer fluid into the washer tank, the cap 13 can be held opened, whereby pouring work of the windshield washer fluid can be performed with good efficiency, thereby making it possible to increase the working properties.

While the invention has been described using the washer inlet attaching structure in which the washer inlet 12 is attached to the upper frame inner 21, the invention can also be applied to a washer inlet attaching structure in which the washer inlet is attached to other vehicle structural bodies than the upper frame. While the invention has been described using the washer inlet attaching structure having the intermediate portions 120, 130, 220, 230 which are made up of the intermediate members 121, 131, 221, 222 and the reinforcement members 123, 133, 223, 233, the invention can also be applied to a washer inlet attaching structure having intermediate portions made up of intermediate members. Even with these washer inlet attaching structures, the same functions and advantages as those of the washer inlet attaching structures according to the first and second embodiments can be provided.

Since the washer inlet attaching structure according to the invention increases the attaching properties by the relatively simple structures, the invention can extremely usefully be made use of in the automotive industry.

What is claimed is:

1. A washer inlet attaching structure, configured to attach a washer inlet to a vehicle structural body made of resin, the washer inlet communicating with a tank main body adapted to store a windshield washer fluid and guiding the windshield washer fluid into the tank main body, the washer inlet attaching structure comprising:
   a washer inlet holding portion, configured to hold the washer inlet, the washer inlet holding portion being molded integrally with the vehicle structural body,
   wherein the washer inlet holding portion includes:
      a washer inlet gripping portion, configured to hold the washer inlet; and
      an intermediate portion, disposed between the washer inlet holding portion and the vehicle structural body, and formed in a plate-like shape, and
   wherein two boundary portions between the intermediate portion and the vehicle structural body are formed rectilinearly,
   wherein the intermediate portion includes a pair of plate-like members, extending between the washer inlet holding portion and the vehicle structural body,
   wherein the washer inlet gripping portion includes a tube holding portion extending outward from an outer wall portion of the washer inlet gripping portion towards the vehicle structural body and between the pair of plate-like members, and
   each of the pair of plate-like members defines an arc portion between the washer inlet gripping portion and the vehicle structural body, such that a tube is supported by the tube holding portion and arc portions of the pair of intermediate portions.

2. A washer inlet attaching structure, configured to attach a washer inlet to a vehicle structural body made or resin, the washer inlet communicating with a tank main body adapted to store a windshield washer fluid and guiding the windshield washer fluid into the tank main body, the washer inlet attaching structure comprising:
- a washer inlet holding portion, configured to hold the washer inlet, the washer inlet holding portion being molded integrally with the vehicle structural body, wherein the washer inlet holding portion includes:
- a washer inlet gripping portion, configured to hold the washer inlet; and
- an intermediate portion, disposed between the washer inlet holding portion and the vehicle structural body, and formed in a plate-like shape, and wherein two boundary portions between the intermediate portion and the vehicle structural body are formed rectilinearly, wherein the washer inlet portion being provided with a cap for closing an inlet opening of the washer inlet and the cap is attached to the circumferential wall portion of the washer inlet via a hinge, wherein the washer holding portion includes a hinge accommodation portion extending outward from an outer wall portion and provided with a projecting portion that selectively engage the hinge to maintain the cap in an open state.

3. The washer inlet attaching structure according to claim 1, wherein
the boundary portions are spaced a distance equal to a diameter of the washer inlet apart from each other.

4. The washer inlet attaching structure according to claim 2, wherein
the boundary portions are spaced a distance equal to a diameter of the washer inlet apart from each other.

* * * * *